(12) United States Patent
Conner

(10) Patent No.: US 10,879,519 B2
(45) Date of Patent: Dec. 29, 2020

(54) SPARK PROTECTION APPARATUS FOR INTRINSICALLY SAFE, BATTERY-OPERATED DEVICES

(71) Applicant: Bayco Products, Inc., Wylie, TX (US)

(72) Inventor: James Conner, Rockwall, TX (US)

(73) Assignee: Bayco Products, Inc., Wylie, TX (US)

( * ) Notice: Subject to any disclaimer, the term of this patent is extended or adjusted under 35 U.S.C. 154(b) by 262 days.

(21) Appl. No.: 16/222,094

(22) Filed: Dec. 17, 2018

(65) Prior Publication Data
US 2020/0194769 A1      Jun. 18, 2020

(51) Int. Cl.
*H01M 2/34* (2006.01)
*H02H 7/18* (2006.01)
*H02H 9/00* (2006.01)

(52) U.S. Cl.
CPC .......... *H01M 2/347* (2013.01); *H02H 7/18* (2013.01); *H02H 9/008* (2013.01)

(58) Field of Classification Search
CPC .. B60W 10/20; B60W 2554/80; B60W 10/08; B60W 2540/18; B60W 30/045; B62D 5/046; B62D 6/002; B62D 11/003; B62D 6/001
USPC ........................................................ 361/101
See application file for complete search history.

(56) References Cited

U.S. PATENT DOCUMENTS

| | | | |
|---|---|---|---|
| 4,064,366 A | 12/1977 | Wheatley et al. | |
| 4,634,936 A | 1/1987 | Gentry et al. | |
| 7,550,943 B2 | 6/2009 | Spartano et al. | |
| 7,641,358 B1 | 1/2010 | Smith et al. | |
| 8,193,789 B2 | 6/2012 | Bayat et al. | |
| 8,805,455 B2 | 8/2014 | Bohne et al. | |
| 9,450,216 B2 | 9/2016 | Kiger | |
| 2013/0193763 A1 | 8/2013 | Zhao et al. | |
| 2016/0197498 A1 | 7/2016 | Mercier et al. | |
| 2017/0142840 A1 | 5/2017 | Surinya | |
| 2017/0271695 A1 | 9/2017 | Kemmer et al. | |
| 2017/0285713 A1* | 10/2017 | Bezawada | H02M 3/04 |

FOREIGN PATENT DOCUMENTS

| | | |
|---|---|---|
| CN | 202535137 U | 11/2012 |
| CN | 202798849 U | 3/2013 |
| CN | 103280869 A | 9/2013 |
| CN | 104362727 A | 2/2015 |
| EP | 2779354 A2 | 9/2014 |
| WO | 2014075111 A1 | 5/2014 |

* cited by examiner

*Primary Examiner* — Dharti H Patel
(74) *Attorney, Agent, or Firm* — Whitaker Chalk Swindle & Schwartz PLLC; Stephen Mosher

(57) ABSTRACT

A simple, low-cost circuit is disclosed that provides the requisite triple redundancy for a spark protection circuit for a battery-operated device having an on-board battery charger that is intended for use in hazardous atmospheres. The circuit complies with the IEC standard for intrinsically safe products.

9 Claims, 2 Drawing Sheets

SPARK PROTECTION APPARATUS FOR INTRINSICALLY SAFE, BATTERY-OPERATED DEVICES

BACKGROUND OF THE INVENTION

1. Field of the Invention

The present invention concerns battery operated portable devices and more particularly battery operated devices for use in potentially explosive environments where electrical discharges could present the hazard of igniting a flammable material.

2. Background of the Invention

Products designed for such uses in explosive environments include features to ensure that electrical discharges or sparks will not occur at any external circuit terminals, even if components in the product fail. Products having those features may be identified as "intrinsically safe" if they comply with the IEC (International Electrical Code) standards for such devices.

A variety of circuit designs and techniques are available for modifying conventional circuits in products with features that ensure no electrical discharge or spark will occur at its external terminals that could ignite hazardous material in the vicinity of the product. The standards for ensuring that such products are intrinsically safe are stringent—as they must be—which often can lead to substantial complexity and cost to implement them. One such standard is the requirement for so-called "triple redundancy," which means that the circuit features designed to protect the product from emitting any sparks at its external terminals must have at least two back up features configured in the product so that all three protective elements must fail together to result in the loss of protection. If one of these elements fails, the other two will continue protecting the circuit, i.e., preventing it from emitting any electrical discharge energy. Similarly, if two of the elements fail, the remaining one continues to provide the required protection.

In one example, an on-board charging circuit of a battery-operated device relies on current or voltage feedback from the battery-operated device to respond to the condition of the battery and provide the correct charging current when the device is connected to an external source of voltage supply for charging the battery. Conventional short-circuit features such as fuses and resistors for limiting current can be used to provide the spark protection need for devices used in explosive atmospheres, but the terminals for connecting the external source voltage must also be blocked to prevent the potential for short circuits to occur at those terminals. Unfortunately, conventional blocking means sharply impairs the available feedback paths for controlling the operation of the battery charger. Moreover, as noted above, the means for providing the blocking of these terminals must be "triple redundant."

Typically, many conventional spark protection circuits or features have the problem of adding significant cost and complexity to a product. In some products, where profit margins are low, or where circuit complexity is an impediment to being competitive in the marketplace, ways must be found that are simpler and lower in cost that provide the requisite protection. Thus there is a need for simpler, lower cost spark protection features that are also reliable.

SUMMARY OF THE INVENTION

In one embodiment, a spark protection circuit is connected between a pair of positive and negative input terminals and a pair of positive and negative output terminals, comprising a blocking diode having an anode connected to the positive input terminal and a cathode connected through a positive supply rail to the positive output terminal; at least one first circuit connected between the blocking diode and the positive supply rail connected to the positive output terminal; and a spark protection circuit connected in a common return rail between the negative output terminal and the negative input terminal; wherein a control terminal of the spark protection circuit is connected to the positive supply rail and connected through a high impedance to the negative output terminal of the spark protection circuit.

In another aspect, the spark protection circuit comprises first, second, and third NMOS field effect transistors connected in series via their respective drain and source terminals in the common return rail between the negative output terminal and the negative input terminal; wherein at least one of the first, second, and third NMOS field effect transistors is connected in opposing polarity with respect to the other two NMOS transistors.

In another aspect, the control terminal of the spark protection circuit comprises a common connection of respective gate terminals of the first, second, and third NMOS field-effect transistors, wherein the gate terminals of the first, second, and third NMOS transistors are connected together to the positive input terminal and connected through a high impedance to the negative output terminal.

In another aspect, the circuit further comprises a battery and a battery-operated device connected in parallel between the positive and negative output terminals.

In another embodiment, a spark protection apparatus is provided for an intrinsically safe, battery-operated device having a first terminal and a second terminal for connecting to an external voltage source, and further comprising: a battery and the battery-operated device connected in parallel between a supply rail and a common return rail in the device; a blocking diode having a first electrode connected to the first terminal and a second electrode connected to the supply rail; a series string of first, second and third MOS field effect transistors connected in order between the second terminal and the common return rail; wherein at least two of the first, second and third MOS field effect transistors, having respective drain, source, and gate terminals, are connected in opposing polarity relative to the remaining field effect transistor; the gate terminals of the first, second and third MOS field effect transistors are connected to a control conductor that is connected to the supply rail; and a pull down resistor is connected between the control conductor and the common return rail.

In another aspect the embodiment comprises a charging circuit having an input connected to the supply rail, an output connected through a feedback impedance to the positive output terminal, and a ground terminal connected to the common return rail.

DETAILED DESCRIPTION OF THE INVENTION

Figure 1:
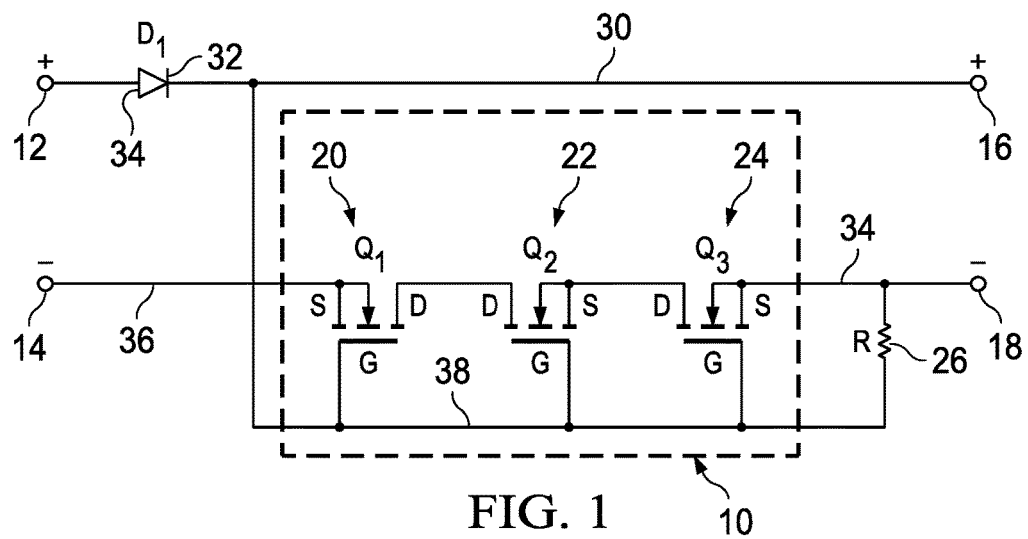
FIG. 1 is an illustration of a spark protection circuit, in accordance with an embodiment of the claimed invention.

Accordingly, in an advance in the state of the art, a simple, low-cost circuit is disclosed that also provides the requisite triple redundancy for a spark protection circuit that complies with the IEC standard for intrinsically safe products. Further, as mentioned previously, the blocking means employed in some configurations can limit or impair the available feedback paths for controlling the operation of the battery charger, and thus imposes a limiting condition on the blocking technique used to provide the spark protection. The present invention overcomes this limitation by placing the spark protection circuit in the common bus return path of the circuit, thus providing a low cost, reliable way to disable the on-board charging circuit of a battery operated device.

The invention is described in three embodiments: as a stand-alone, four-terminal circuit; as a battery operated device having the spark protection circuit built-in; and as a battery operated circuit that includes an on-board charging circuit and having the spark protection circuit built-in to the circuitry.

In all three embodiments, the spark protection circuit comprises first, second, and third NMOS field effect transistors ("FET") connected in series through their respective drain and source terminals in the common return bus between the negative input terminal and the negative output terminal of the circuit. In this invention, one of the first, second, and third NMOS field effect transistors is connected in opposing polarity with respect to the other two NMOS transistors. Further, the gate or control terminals of the first, second, and third field effect transistors are connected in a common connection to a positive source voltage terminal of the circuit, and a high-impedance pull down resistor R1 is connected between the common connection to the gate terminals and a common bus return terminal of the circuit. The anode of a blocking diode D1 is preferably connected to the positive power source terminal to prevent damage to the circuits if the external power source voltage is connected with reversed polarity.

The use of three NMOS field effect transistors connected in series provides the triple redundancy required by the IEC Standard in a very simple way. When power is applied to the positive source voltage terminal the common gates are pulled high causing the three NMOS FETs to conduct in saturation, that is, the Vds (drain-source voltage) drop across the transistors is near zero, thereby placing the common bus side of the circuit in a conductive condition. When power is removed from the positive source voltage terminal, the pull-down resistor R1 pulls the gates below the Vgs (gate-source voltage) threshold of the NMOS transistors, thereby causing the three NMOS FETs to cut off. With the transistors cut off, their internal P-N junction is effectively a blocking diode. This action disconnects the current path between the battery in the device and the external terminals. Thus, with the source voltage disconnected and the common return path open-circuited, no current that could cause a short circuit at the external terminals is present in the circuit, eliminating the possibility of a spark at those source voltage terminals.

The disclosed circuit meets the triple-redundant requirement because of the use of three transistors in series, each of which can provide the open-circuit condition. Thus, even if one or two of the NMOS transistors become short-circuited, the remaining third NMOS transistor maintains an open circuit common bus return path in the battery-operated device.

In the event that the drain/source path of one of the NMOS transistors becomes open-circuited, the common bus return path is disabled and no current can flow to the source voltage input terminals. The battery-operated device will remain operative as long as the battery has charge. However, the device can no longer be connected to the external source voltage for charging the on-board battery.

Regarding the drawings, the embodiments shown are intended to illustrate the concepts of the invention without limiting their scope. In the following description a given reference number that appears in more than one figure refers to the same structure.

Figure 2:
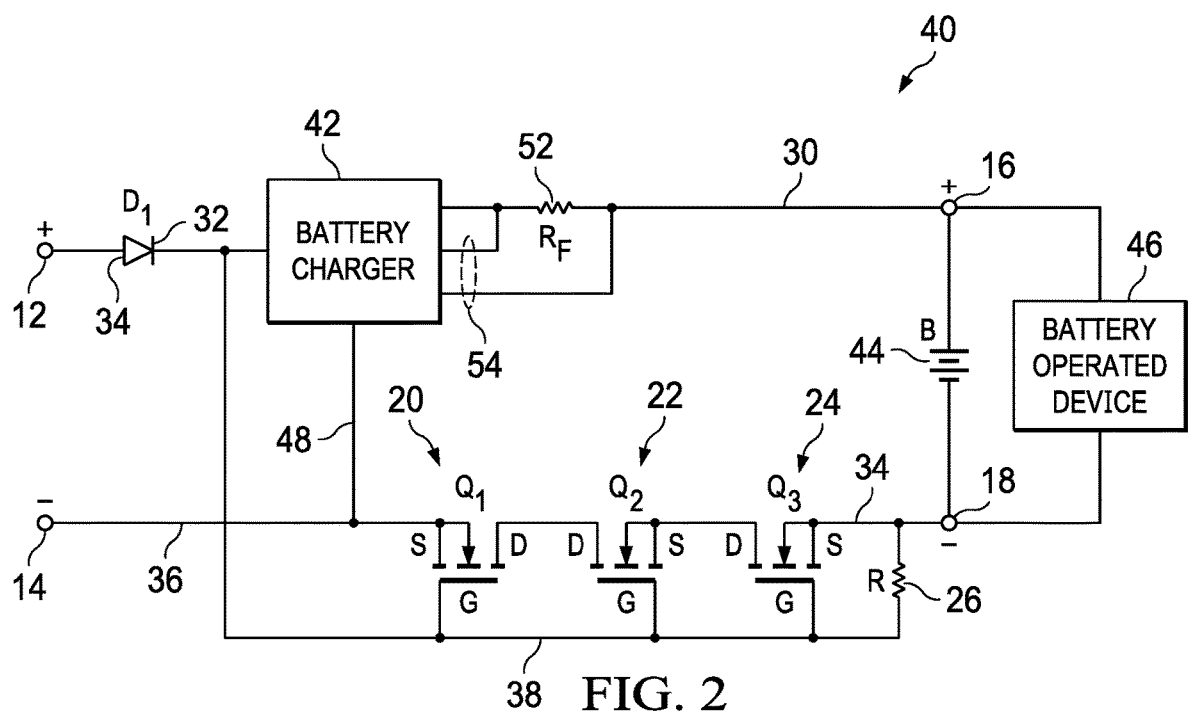
FIG. 2 is an illustration of an application of the embodiment of FIG. 1, in accordance with an embodiment of the claimed invention.
Figure 3:
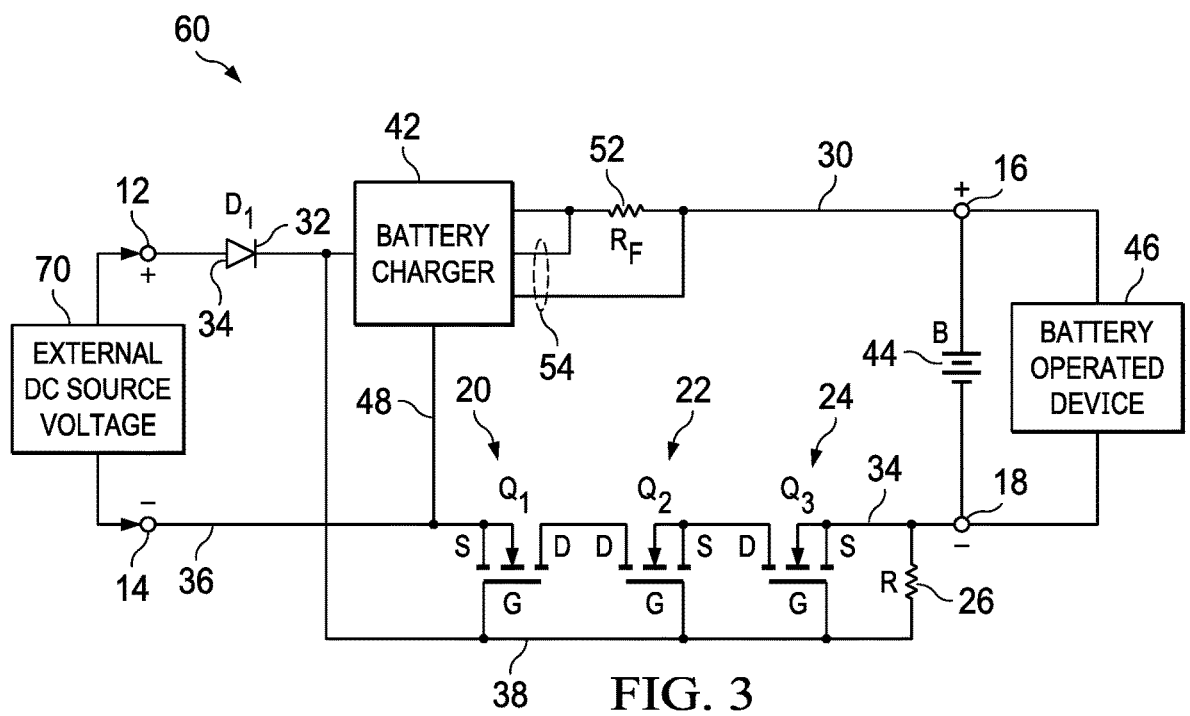
FIG. 3 is an illustration of the embodiment of FIG. 2 of the present claimed invention connected to an external source of DC voltage.

FIG. 1 illustrates a first, stand-alone, four-terminal embodiment of a circuit containing the spark protection circuit 10, shown within the dashed line box, that may be connected between an external DC supply voltage 70 at its input and a battery-operated device 46 connected to its output as shown in FIG. 3. As mentioned previously, a circuit element such as a blocking diode 32 may be connected between the positive (source voltage) input terminal 12 and the positive supply rail 30. The spark protection circuit 10, consisting of the three NMOS field effect transistors 20, 22, and 24, is shown connected in the negative or common return side 36 of the circuit between the negative (source voltage) input terminal 14 and the negative output terminal 18. If a voltage regulator or other active circuit such as a battery charger 42 is connected in the positive supply rail (see FIG. 2), its ground or common terminal 48 would be connected to the common bus return 36.

In the case shown in FIG. 1 where a blocking diode 32 alone is used in the positive supply rail 30, the common gate or control terminal line 38 of the spark protection circuit 10 is connected to the cathode terminal 34 of the blocking diode 32. The blocking diode 32 serves at least two functions. One, it protects the circuit if the positive external power source voltage 12 is connected in reversed polarity. Two, it will block or limit the flow of current from the on-board battery 44 toward the positive input (first) terminal. Three, it will block or limit the flow of current that may occur if an on-board battery charger circuit 42 such as shown in FIGS. 2 and 3 develops a short circuit between its positive supply input, for example Vcc, and the positive output terminal of the charging circuit.

The three NMOS FETs 20, 22, 24 connected in series provides the triple redundancy because the three transistors each contain an internal blocking diode to ensure that the common return rail is opened and held open by the three NMOS transistors 20, 22, 24. This action occurs when the source voltage is removed from the source voltage terminals, the voltage on the positive source voltage input decays to zero and the value of the control voltage applied to Vgs voltage across R1 (26) falls below its threshold, causing the three NMOS transistors to cut off.

FIG. 2 illustrates a second embodiment 40 of the spark protection circuit 10 of FIG. 1 with an active circuit such as a battery charger 42 (or a voltage regulator) connected between the positive source voltage input terminal 12 and the positive output terminal 16. The common or ground terminal 48 of the battery charger 42 is connected to the negative source voltage terminal 14. In the circuit shown, a feedback resistor R (52) may provide a current sense signal via a pair of sense lines 54 to the battery charger circuit 42. The current sense signal together with the voltage of the battery 44 indicate the charge state of the connected battery 44.

Continuing with FIG. 2, a battery 44 and the circuit of a battery operated device 46 are shown connected in parallel across the positive 16 and negative 18 output terminals of the spark protection circuit 10. It should be clear from this illustration 40 that the combination of the battery 44 and the components connected to the output terminals of the spark protection circuit 10, i.e., the battery operated device 46 cannot provide any current to cause a spark when the source voltage is disconnected from the positive 12 and negative 14 input terminals because the common return rail 38 is automatically opened by the three NMOS transistors 20, 22, 24 when the source voltage is disconnected.

FIG. 3 illustrates a third embodiment 60 the spark protection circuit 10 of FIG. 2 with the addition of the source voltage 70 connected to the positive 12 and negative 14 source input terminals. This embodiment represents a battery operated device 46 having an on-board battery 44 and a built-in battery charger 42, which also has a pair of terminals 12, 14 for connecting the source voltage 70 to the battery operated device 46 when it is necessary to cause the on-board battery charger 42 to charge the on-board battery 44 in the device 46. As described in the circuit of FIG. 2, the combination of the battery 44 and the components connected to the output terminals of the spark protection circuit 10, i.e., the battery-operated device 46, cannot provide any current to cause a spark at the external terminals 12, 14 when the source voltage is disconnected from the positive 12 and negative 14 input terminals because the common return rail 38 is automatically opened by the three NMOS transistors 20, 22, 24 of the spark protection circuit 10 when the external source voltage 70 is disconnected.

While the invention has been described and illustrated depicting one example and several applications of the spark protection circuit, persons skilled in the art will recognize that other configurations of the basic concept illustrated herein are possible. Variations in the types and ratings of the components is possible to suit particular requirements. In one example, other types of semiconductors having properties similar to NMOS field-effect transistors may be used if they include a control terminal that operates in the manner of the gate in a field-effect transistor and provides the function of its internal blocking diode. The illustrated embodiments, for example, employ NMOS Field Effect transistors, a 12 volt DC external power source, a pull-down resistor R1 of approximately 100K Ohms; but these values are in no way intended to be limiting.

What is claimed is:

1. In an intrinsically safe battery operated device, a spark protection circuit connected between positive and negative input terminals and positive and negative output terminals, comprising:
   a blocking diode having an anode connected to the positive input terminal and a cathode connected through a positive supply rail to the positive output terminal;
   at least one first circuit connected between the blocking diode and the positive supply rail connected to the positive output terminal; and
   a spark protection circuit connected in a common return rail between the negative output terminal and the negative input terminal; wherein
   a control terminal of the spark protection circuit is connected to the positive supply rail and connected through a high impedance to the negative output terminal of the spark protection circuit.

2. The circuit of claim 1, wherein the first circuit comprises:
   a charging circuit having an input connected to the cathode of the blocking diode and an output connected to the positive supply rail; and
   a ground return connected to the negative input terminal.

3. The circuit of claim 1, wherein the spark protection circuit comprises:
   first, second, and third NMOS field effect transistors connected in series via their respective drain and source terminals in the common return rail between the positive input terminal and the negative output terminal; wherein
   at least one of the first, second, and third NMOS field effect transistors is connected in opposing polarity with respect to the other two NMOS transistors.

4. Spark protection apparatus for an intrinsically safe, battery-operated device having a first terminal and a second terminal for connecting to an external voltage source, and further comprising:
   a battery and the battery-operated device connected in parallel between a supply rail and a common return rail in the device;
   a blocking diode having a first electrode connected to the first terminal and a second electrode connected to the supply rail;
   a series string of first, second and third MOS field effect transistors connected in order between the second terminal and the common return rail; wherein
   at least two of the first, second and third MOS field effect transistors, having respective drain, source, and gate terminals, are connected in opposing polarity relative to the remaining field effect transistor;
   the gate terminals of the first, second and third MOS field effect transistors are connected to a control conductor that is connected to the supply rail; and
   a pull down resistor is connected between the control conductor and the common return rail.

5. The circuit of claim 4 wherein the control terminal of the spark protection circuit comprises:
   a common connection of respective gate terminals of the first, second, and third NMOS field-effect transistors connected together to the positive supply rail; and
   the common connection is also connected through a high impedance to the negative output terminal.

6. The apparatus of claim 4, wherein:
   the first terminal is a positive terminal and the second terminal is a negative terminal; and
   the first electrode is a positive electrode and the second electrode is a negative electrode.

7. The apparatus of claim 4, wherein:
   the first electrode is an anode; and
   the second electrode is a cathode.

8. The apparatus of claim 4, wherein further comprising:
   a charging circuit having an input connected to the supply rail, an output connected through a feedback impedance to the positive output terminal, and a ground terminal connected to the common return rail.

9. The apparatus of claim 4, wherein:
   the MOS field effect transistor is an NMOS transistor.

* * * * *